US008126516B2

(12) United States Patent
Johnston et al.

(10) Patent No.: US 8,126,516 B2
(45) Date of Patent: Feb. 28, 2012

(54) APPARATUS FOR CHARGING A PORTABLE ELECTRONIC DEVICE HAVING A ROTATABLE HOUSING

(75) Inventors: Ronald A. Johnston, Wheeling, IL (US); Martin Pais, North Barrington, IL (US); Mangaraju Vuppala, Lake Zurich, IL (US); David Zeiger, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 605 days.

(21) Appl. No.: 12/271,271

(22) Filed: Nov. 14, 2008

(65) Prior Publication Data

US 2010/0124948 A1 May 20, 2010

(51) Int. Cl.
*H04B 1/38* (2006.01)
*H04M 1/00* (2006.01)
*H02J 7/00* (2006.01)

(52) U.S. Cl. ............ 455/573; 320/114; 455/550.1; 455/575.1; 455/575.3

(58) Field of Classification Search ........ 455/550.1, 455/573, 575.1, 575.3, 575.8; 320/114
See application file for complete search history.

(56) References Cited

U.S. PATENT DOCUMENTS

| 5,806,294 | A  | * | 9/1998  | Strieber ................... 56/249 |
| 6,617,724 | B2 |   | 9/2003  | Yamaguchi |
| 6,762,518 | B1 |   | 7/2004  | Yamaguchi et al. |
| 6,812,603 | B2 |   | 11/2004 | Nishio |
| 6,850,784 | B2 | * | 2/2005  | SanGiovanni ......... 455/575.1 |
| 6,932,737 | B2 | * | 8/2005  | Grassl et al. ............... 477/4 |
| 7,239,237 | B2 | * | 7/2007  | Hess ....................... 340/539.1 |
| 7,787,912 | B2 | * | 8/2010  | Saila ....................... 455/575.1 |
| 2003/0087677 | A1 | * | 5/2003 | Miller et al. ............... 455/572 |
| 2004/0132482 | A1 | * | 7/2004 | Kang et al. ............. 455/550.1 |
| 2004/0204180 | A1 |   | 10/2004 | Liao |

FOREIGN PATENT DOCUMENTS

GB  2399984 A  9/2004

OTHER PUBLICATIONS

Sung Hong Won & Ju Lee; Analysis of Flat-Type Vibration Motor for Mobile Phone; IEEE Transactions on Magnetics, vol. 41, No. 10, Oct. 2005.
Micromo Electronics, Inc.; Flat Brushless DC Motors—Data Sheets; http://www.micromo.com/servlet/com.itmr.waw.servlet.Anzeige?fremdaufruf=ja&kdid=; Nov. 14, 2008.
AC Motors; Brushless DC Motor; http://www.allaboutcircuits.com/vol_2/chpt_13/6.html; Nov. 14, 2008.
Justin Thomas; A Better Hand-Cranked LED Flashlight; http://www.treehugger.com/files/2005/09/a_better_hand-c.php; Sep. 27, 2005.

* cited by examiner

*Primary Examiner* — Dwayne Bost
*Assistant Examiner* — Larry Sternbane

(57) ABSTRACT

An apparatus (100) that charges a portable electronic device having a rotatable housing is disclosed. The apparatus can include a first portable electronic device housing (110) and first selective call receiver circuitry (121) contained within the first portable electronic device housing. The apparatus can also include a second portable electronic device housing (115) rotatably coupled to the first portable electronic device housing, where the second portable electronic device housing can be rotatable (118) about an axis of the first portable electronic device housing. The apparatus can also include second selective call receiver circuitry (122) contained within the second portable electronic device housing, where the second selective call receiver circuitry can be coupled to the first selective call receiver circuitry. The apparatus can also include a battery (190). The apparatus can also include an integral electric generator (180) coupled to the first portable electronic device housing, coupled to the second portable electronic device housing, and coupled to the battery, where the integral electric generator can be configured to charge the battery based on rotation of the first portable electronic device housing relative to the second portable electronic device housing.

19 Claims, 4 Drawing Sheets

APPARATUS FOR CHARGING A PORTABLE ELECTRONIC DEVICE HAVING A ROTATABLE HOUSING

BACKGROUND

1. Field

The present disclosure is directed to an apparatus for charging a portable electronic device having a rotatable housing. More particularly, the present disclosure is directed to charging a portable electronic device battery based on rotation of a first portable electronic device housing relative to a second portable electronic device housing.

2. Introduction

Presently, portable electronic devices, such as mobile phones, are carried by many people. Not only do these devices provide for convenient communications, but they also provide for essential communications during emergency situations. Such emergency situations can include a smaller emergency, such as an automotive problem in a remote area. The emergency situations can also include larger emergencies, such as people stranded when a building collapses or people lost in the wilderness. Unfortunately, portable electronic devices that may be essential for survival in such situations use batteries that have limited power supplies. Even when fully charged, these batteries can only provide enough power for about a week of standby time and enough power for less than a day of talk time. Such power is not sufficient when a user must engage in communications over days without access to a suitable means for recharging the device battery. Furthermore, a user may forget to charge the device battery and the power may be depleted before a user realizes there is a need to communicate. Even in non-emergency situations, it is inconvenient when a device battery loses power when there is no access to a suitable source for charging the battery.

Thus, there is a need for an apparatus that autonomously charges a portable electronic device having a rotatable housing.

SUMMARY

An apparatus that autonomously charges a portable electronic device having a rotatable housing is disclosed. The apparatus can include a first portable electronic device housing and first selective call receiver circuitry contained within the first portable electronic device housing. The apparatus can also include a second portable electronic device housing rotatably coupled to the first portable electronic device housing, where the second portable electronic device housing can be rotatable about an axis of the first portable electronic device housing. The apparatus can also include second selective call receiver circuitry contained within the second portable electronic device housing, where the second selective call receiver circuitry can be coupled to the first selective call receiver circuitry. The apparatus can also include a battery. The apparatus can also include an integral electric generator coupled to the first portable electronic device housing, coupled to the second portable electronic device housing, and coupled to the battery, where the integral electric generator can be configured to charge the battery based on rotation of the first portable electronic device housing relative to the second portable electronic device housing.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
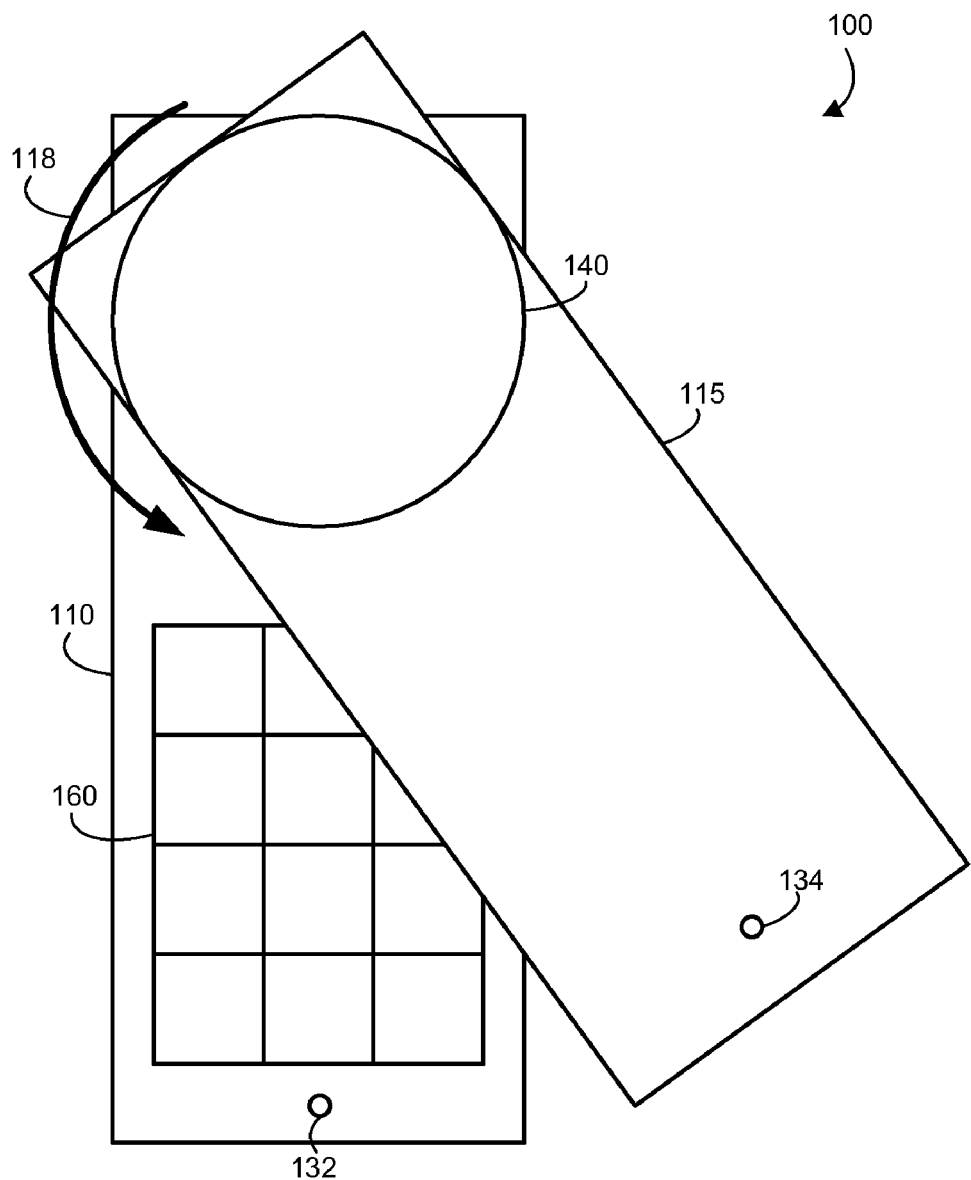
FIG. 1 is an exemplary top view illustration of an apparatus according to a possible embodiment.

FIG. 1 is an exemplary top view illustration of an apparatus 100 according to a possible embodiment. The apparatus 100 may be a wireless communication device, such as a wireless telephone, a cellular telephone, a personal digital assistant, a pager, a selective call receiver, or any other device that is capable of sending and receiving communication signals on a network including wireless network. Such a network may include any type of network that is capable of sending and receiving signals, such as wireless signals, such as a wireless telecommunications network, a cellular telephone network, a Time Division Multiple Access (TDMA) network, a Code Division Multiple Access (CDMA) network, a satellite communications network, and other like communications systems. The apparatus 100 can include a first portable electronic device housing 110 that can contain first selective call receiver circuitry. The apparatus 100 can include a second portable electronic device housing 115 rotatably 118 coupled to the first portable electronic device housing 110. The second portable electronic device housing 115 can contain second selective call receiver circuitry. The apparatus 100 can include a battery coupled to elements of the apparatus 100 that require power. The apparatus 100 can also include an integral electric generator coupled to the first portable electronic device housing 110, coupled to the second portable electronic device housing 115, and coupled to the battery. The integral electric generator can be configured to charge the battery based on rotation 118 of the first portable electronic device housing 110 relative to the second portable electronic device housing 115. For example, the second portable electronic device housing 115 can be configured to rotate about the first portable electronic device housing 110 to activate the generator to charge the battery. The first portable electronic device housing 110 can include a user interface 160 and a microphone 132. The second portable electronic device housing 115 can include a speaker or earpiece 134. The apparatus 100 can also include a display 140.

For example, the apparatus 100 can be a rotator phone 100 that can power and/or charge itself. A flip portion, also known as a blade housing, such as the second portable electronic device housing 115, of the rotator phone 100 can rotate in a plane of the rotator phone 100 relative to the first portable electronic device housing 110. A moment-arm-crank facilitated by rotation of the second portable electronic device housing 115 can drive a generator that can be located within the first portable electronic device housing 110. The apparatus 100 can run in a Bluetooth mode to a headset or in a speakerphone mode while the second portable electronic device housing 115 is being cranked to continuously generate power. The second portable electronic device housing 115 can be engaged at a hub to a gear mechanism for added mechanical advantage and/or to a flat pancake motor for high power density capability. The second portable electronic device housing 115 can also be engaged to a generator via a clutch to switch between power and non-power generation modes. The second portable electronic device housing 115 can include an extendable crank handle for ease of cranking. An optical interconnect can be used between the housings 110 and 115 to allow for communication between the second portable electronic device housing 115 and the first portable electronic device housing 110. The apparatus 100 can allow a user to generate power for the apparatus 100 when no other power sources are available. The user can then make and sustain a phone call not only after cranking and storing energy but also while cranking the second portable electronic device housing 115.

For example, the apparatus 100 can be a rotator phone capable of charging itself by rotating an upper blade 115 to generate the needed power to make and/or sustain a phone call. The apparatus 100 can operate in a Bluetooth mode with a headset or in a speaker-phone mode, to communicate during a call while the apparatus 100 generates power for the call.

Figure 2:
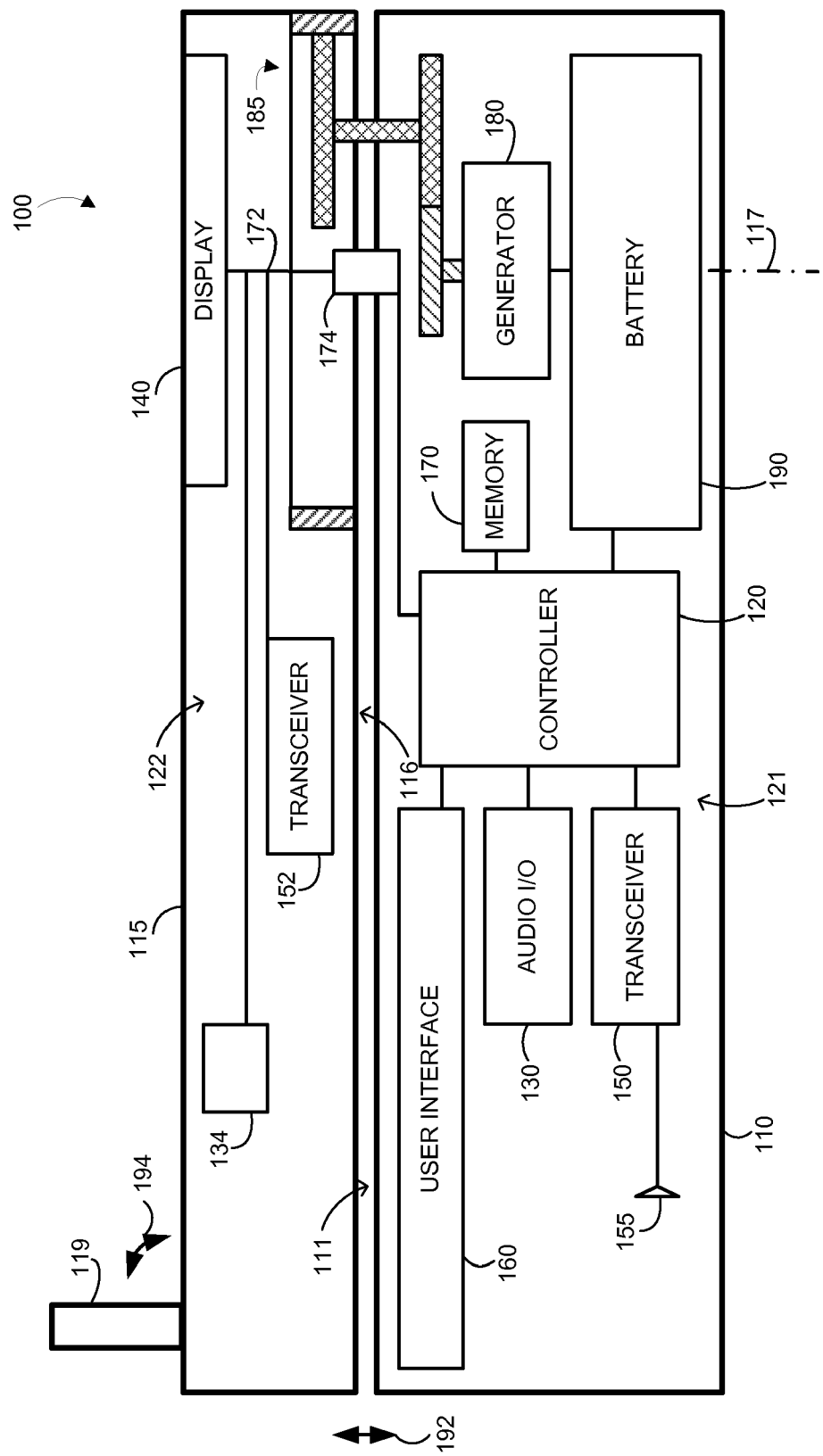
FIG. 2 is an exemplary open side view diagram an apparatus according to a possible embodiment.

FIG. 2 is an exemplary open side view diagram of the apparatus 100 according to a possible embodiment. The apparatus 100 can be a mobile phone, a cellular phone, a personal digital assistant, or any other device that can engage in selective call receiver communications over a long distance wireless network. The apparatus 100 can include a first portable electronic device housing 110 and first selective call receiver circuitry 121 contained within the first portable electronic device housing 110. The apparatus 100 can include a second portable electronic device housing 115 rotatably coupled to the first portable electronic device housing 110. The second portable electronic device 115 housing can be rotatable about an axis 117 of the first portable electronic device housing 110. The axis 117 can be parallel to a height of the first portable electronic device housing 110 and the second portable electronic device housing 115, which can be perpendicular to a length and width of the housings, which are greater than the height. The apparatus 100 can include second selective call receiver circuitry 122 contained within the second portable electronic device housing 115, where the second selective call receiver circuitry 122 can be coupled to the first selective call receiver circuitry 121. The second selective call receiver circuitry 122 can be wirelessly coupled, wiredly coupled, optically coupled, or otherwise operatively coupled to the first selective call receiver circuitry 121. Selective call receiver circuitry can be any circuitry useful in a selective call receiver. For example, selective call receiver circuitry can include circuitry useful for a transceiver, circuitry useful for an acoustic transducer or speaker, circuitry useful for a display, circuitry useful for a data entry keypad, or any other circuitry useful in a selective call receiver. The apparatus 100 can include a battery 190 coupled to elements of the apparatus 100 that require power. The apparatus 100 can also include an integral electric generator 180 coupled to the first portable electronic device housing 110, coupled to the second portable electronic device housing 115, and coupled to the battery 190. The integral electric generator 180 can be configured to charge the battery 190 based on rotation of the first portable electronic device housing 110 relative to the second portable electronic device housing 115. The integral electric generator 180 can be a generator, can be an alternator, can be a flat motor, can be a pancake motor, or can be any other device that can charge a battery based on rotation of one housing relative to another housing. For example, the second portable electronic device housing 115 can be configured to rotate about the first portable electronic device housing 110 to activate the generator 180 to charge the battery 190.

The apparatus 100 can include an optical data connection 172 coupled between the first portable electronic device housing 110 and the second portable electronic device housing 115 and the second selective call receiver circuitry 122 can be coupled to the first selective call receiver circuitry 121 via the optical data connection 172. The apparatus 100 can include a hinge 174 coupled to the first portable electronic device housing 110 and coupled to the second portable electronic device housing 115. The hinge 174 can include the optical data connection 172 and the second portable electronic device housing 115 can be rotatably coupled to the first portable electronic device housing 110 via the hinge 174. The integral electric generator 180 can be coupled to the first portable electronic device housing 110 and coupled to the second portable electronic device housing 115 via the hinge 174.

The first selective call receiver circuitry 121 can include a selective call receiver transceiver 150 and can include an antenna 155 coupled to the selective call receiver transceiver 150. The selective call receiver transceiver 150 can be configured to maintain a call while the integral electric generator 180 charges the battery 190. The transceiver 150 can also be a short range wireless transceiver and the short range wireless transceiver can be configured to maintain a short range wireless connection while the integral electric generator 180 charges the battery 190. For example, a short range wireless transceiver can be an infrared transceiver, a Bluetooth transceiver, or any other transceiver that can maintain a short range wireless connection. The short range wireless transceiver can be coupled to a wireless headset while the integral electric generator 180 charges the battery 190.

The first selective call receiver circuitry 121 can include audio input and output circuitry 130 that can include a speakerphone speaker. The speakerphone speaker can be configured to provide an audio interface while the integral electric generator 180 charges the battery 190. The audio input and output circuitry 130 can also include a microphone, an earpiece speaker, a transducer, or any other audio input and output circuitry.

The first portable electronic device housing 110 can include a first substantially planar surface 111. The second portable electronic device housing 115 can include a second substantially planar surface 116 configured to rotatably slide across the first substantially planar surface 111 in a plane substantially parallel to the first substantially planar surface 111. The apparatus 100 can include an extendable and retractable 194 crank handle 119. The crank handle 119 can be configured to assist in rotating the second portable electronic device housing 115 about an axis 117 of the first portable electronic device housing 110. The crank handle 119 can be coupled to the second portable electronic device housing 115 or can be coupled to the first portable electronic device housing 110 or an extendable crank handle can be coupled to each of the second portable electronic device housing 115 and the first portable electronic device housing 110.

The second portable electronic device housing 115 can be detachably coupled 192 to the first portable electronic device housing 110. The first portable electronic device housing 110 can include a first short range wireless transceiver 150. The second portable electronic device housing 115 can include a second short range wireless transceiver 152 wirelessly coupled to the first short range wireless transceiver 150 when the second portable electronic device housing 115 is detached from the first portable electronic device housing 110. A short range wireless transceiver can be an infrared transceiver, a Bluetooth transceiver, or any other transceiver that can maintain a short range wireless connection. For example, the second portable electronic device housing 115 can be a rotatable blade that can include a headset built into blade, which can be enabled when the second portable electronic device housing 115 is detached from the first portable electronic device housing 110. When the second portable electronic device housing 115 is decoupled from the first portable electronic device housing 110, the short range wireless transceivers 150 and 152 can maintain a short range wireless connection while the integral electric generator 180 charges the battery 190 using a mechanical interface that can be integrated into the hinge 174. Both the second portable electronic device housing 115 and the first portable electronic device 110 housing can include batteries and the integral electric generator 180 can charge both batteries when the housings 110 and 115 are connected and can charge just the battery 190 in the first portable electronic device housing 110 when the housings 110 and 115 are disconnected. For example, if the two housings 110 and 115 are detached and communicating over a short-range wireless connection, only one battery may be charged on the housing containing the integral electric generator 180. As a further example, the second portable electronic device housing 115 can be a rotatable blade that can have a built in non-removable, short-range transceiver 152 that can be used when the second portable electronic device housing 115 is decoupled from the first portable electronic device housing 110 and/or vice versa.

The second portable electronic device housing 115 can be rotatable 360 degrees about an axis 117 of the first portable electronic device housing 110. For example, the second portable electronic device housing 115 can rotate 360 degrees about an axis 117 of the first portable electronic device housing 110 in a single rotation and can then stop and rotate back. The second portable electronic device housing 115 can alternately or also rotate 360 degrees about the axis 117 of the first portable electronic device housing 110 with the ability to continue rotating past 360 degrees for a virtually infinite number of rotations. The second portable electronic device housing 115 can also rotate approximately 180 degrees about the axis 117 of the first portable electronic device housing 110, stop, and then rotate back. Thus, the integral electric generator 180 can charge the battery 190 based on rotation of the first portable electronic device housing 110 relative to the second portable electronic device housing 115 in a reciprocating back and forth rotational motion of approximately 180 degrees, 360 degrees, or other useful degrees of rotation. An optical and/or brush connection can be used for communication and electrical connectivity between the housings 110 and 115 for both reciprocating and continuous rotation.

The apparatus 100 can include a controller 120, a display 140, a user interface 160, and a memory 170. The controller 120 can control operations of the apparatus 100. The display 140 can be a liquid crystal display (LCD), a light emitting diode (LED) display, a plasma display, or any other means for displaying information. The user interface 160 can include a keypad, buttons, a touch pad, a joystick, an additional display, or any other device useful for providing an interface between a user and an electronic device. The memory 170 may include a random access memory, a read only memory, an optical memory, a subscriber identity module memory, or any other memory that can be coupled to a portable electronic device. The apparatus 100 can include gears 185. The gears 185 can have different numbers of teeth and different diameters that provide for different gear ratios for driving the generator 180. According to one example, a gear ratio of 1:20 can be used to drive the generator 180. According to another example, a hand crank 119 can be a 100 mm long radius arm that can be used to rotate the second portable electronic device housing 115 at 2 revolutions per second with a 0.5 kg force, which can drive the generator at 2400 rpm, which can generate 6 W of power to charge the battery 190.

According to a related embodiment, the apparatus 100 can be a rotator mobile phone 100. The rotator mobile phone 100 can include a rotator mobile phone base housing 110 and a controller 120 coupled to the rotator mobile phone base housing 110. The controller 120 can be configured to control operations of the rotator mobile phone 100. The rotator mobile phone 100 can include a selective call receiver transceiver 150 coupled to the rotator mobile phone base housing 110. The rotator mobile phone 100 can include a rotator mobile phone blade housing 115 rotatably coupled to the rotator mobile phone base housing 110. The rotator mobile phone blade housing 115 can be rotatable 360 degrees about an axis 117 of the rotator mobile phone base housing 110. The rotator mobile phone 100 can include a speaker 134 coupled to the rotator mobile phone blade housing 115 and coupled to the controller 120. The rotator mobile phone 100 can include a battery 190 coupled to the rotator mobile phone base housing 110 and coupled to the controller 120. The rotator mobile phone 100 can include an integral electric generator 180 coupled to the rotator mobile phone base housing 110, coupled to the rotator mobile phone blade housing 115, and coupled to the battery 190. The integral electric generator 180 can be configured to charge the battery 190 based on rotation of the rotator mobile phone blade housing 115 relative to the rotator mobile phone base housing 110.

The rotator mobile phone 100 can include audio input and output circuitry 130 including a speakerphone speaker coupled to the rotator mobile phone base housing 110. The speakerphone speaker can be configured to provide an audio interface while the electric generator 180 charges the battery 190. The rotator mobile phone 100 can include a mechanical interface 174 coupled between the rotator mobile phone base housing 110 and the rotator mobile phone blade 115 housing and coupled to the integral electric generator 180. The rotator mobile phone blade housing 115 can be detachably coupled to the rotator mobile phone base housing 110 via the mechanical interface 174. The mechanical interface 174 can be configured to drive the integral electric generator 180 when the rotator mobile phone blade housing 115 is detached from the rotator mobile phone base housing 110. The rotator mobile phone base housing 110 can include a first short range wireless transceiver 150 and the rotator mobile phone blade housing 115 can include a second short range wireless transceiver 152 that can be wirelessly coupled to the first short range wireless transceiver 150 when the rotator mobile phone blade housing 115 is detached from the rotator mobile phone base housing 110. The second short range transceiver 152 in the rotator mobile phone blade housing 115 can be a Bluetooth walkie-talkie transceiver configured to communicate with another walkie-talkie transceiver, such as another blade rotator mobile phone Bluetooth walkie-talkie transceiver.

According to a related embodiment, the apparatus 100 can be a rotator mobile phone 100. The rotator mobile phone 100 can include a rotator mobile phone base housing 110. The rotator mobile phone 100 can include a controller 120 coupled to the rotator mobile phone base housing 110. The controller 120 can be configured to control operations of the rotator mobile phone 100. The rotator mobile phone 100 can include a selective call receiver transceiver 150 coupled to the rotator mobile phone base housing 110 and coupled to the controller 120. The rotator mobile phone 100 can include a display 140 coupled to the rotator mobile phone base housing 110 and coupled to the controller 120. The rotator mobile phone 100 can include an audio interface 130 including a speakerphone speaker coupled to the rotator mobile phone base housing 110 and coupled to the controller 120. The rotator mobile phone 100 can include a battery 190 coupled to the rotator mobile phone base housing 110 and coupled to the controller 120. The rotator mobile phone 100 can include a rotator mobile phone blade housing 115 rotatably coupled to the rotator mobile phone base housing 110. The rotator mobile phone blade housing 115 can be rotatable 360 degrees about an axis 117 of the rotator mobile phone base housing 110. The rotator mobile phone 100 can include a speaker 134 coupled to the rotator mobile phone blade housing 115 and coupled to the controller 120. The rotator mobile phone 100 can include an integral electric generator 180 coupled to the rotator mobile phone base housing 110, coupled to the rotator mobile phone blade housing 115, and coupled to the battery 190. The integral electric generator 180 can be configured to charge the battery 190 based on rotation of the rotator mobile phone blade housing 115 relative to the rotator mobile phone base housing 110.

The battery 190 may have a limited charge capacity. If a user of the rotator mobile phone 100 continues to drive the integral electric generator 180 after the battery 190 is fully charged, the excess power can be dumped or diverted to a load to eliminate heat. An audible and/or visual indicator can alert the user of the battery 190 charge status and can recommend stopping the charging of the battery 190. Similarly, the indicator can inform the user how much the integral electric generator 180 needs to be driven to enable a phone call whether or not the first portable electronic device housing 110 is coupled to the second portable electronic device housing 115. A visual indicator can provide a visual alert on the display 140 and/or can provide a visual alert using a separate indicator such as a light emitting diode, a flashing light, or other useful visual indicator.

Figure 3:
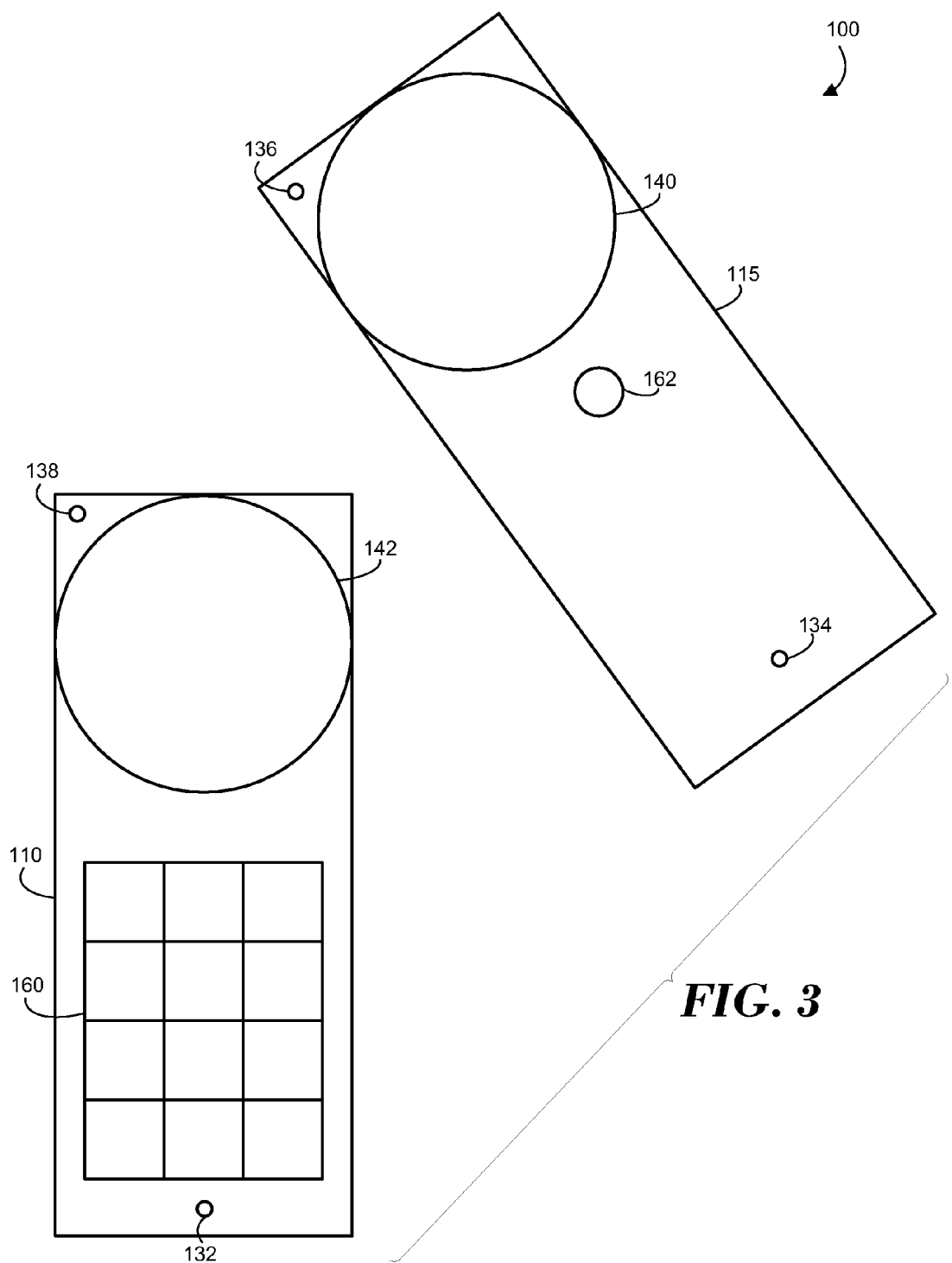
FIG. 3 is an exemplary top view illustration of an apparatus according to a possible embodiment.

FIG. 3 is an exemplary top view illustration of the apparatus 100 according to a possible embodiment. The second portable electronic device housing 115 can be detachably coupled to the first portable electronic device housing 110. The hinge including the mechanical interface 174 from the previous embodiment can be configured to drive the integral electric generator 180 when the second portable electronic device housing 115 is detached from the first portable electronic device housing 110. For example, the second portable electronic device housing 115 can decouple from the first portable electronic device housing 110 and any crank that is configured to couple via the mechanical interface in the hinge 174 to the first portable electronic device housing 110 can drive the integral electric generator 180 to charge the battery 190. As a further example, the mechanical interface 174 can include a crank can be part of a device that couples the first portable electronic device housing 110 to movable elements of a bicycle or other means for driving a generator to drive the integral electric generator 180. Additionally, the audio input and output circuitry 130 can include a public speakerphone that can be enabled when using the mechanical interface 174 if the second portable electronic device housing 115 is missing or inoperable. Furthermore, the second portable electronic device housing 115 can operate as a short range wireless headset that can communicate with a transceiver in the first portable electronic device housing 110. For example, the second portable electronic device housing 115 can include a display 140, a user interface 162, such as a button or other user interface, a speaker 134, and a microphone 136 that provide for communications between elements of the second portable electronic device housing 115 and elements in the first portable electronic device housing 110. The first portable electronic device housing 110 can also include a display 142, a microphone 132, a speaker 138, and a user interface 160, such as a keypad or buttons that provide for communications between elements of the second portable electronic device housing 115 and elements in the first portable electronic device housing 110.

Figure 4:
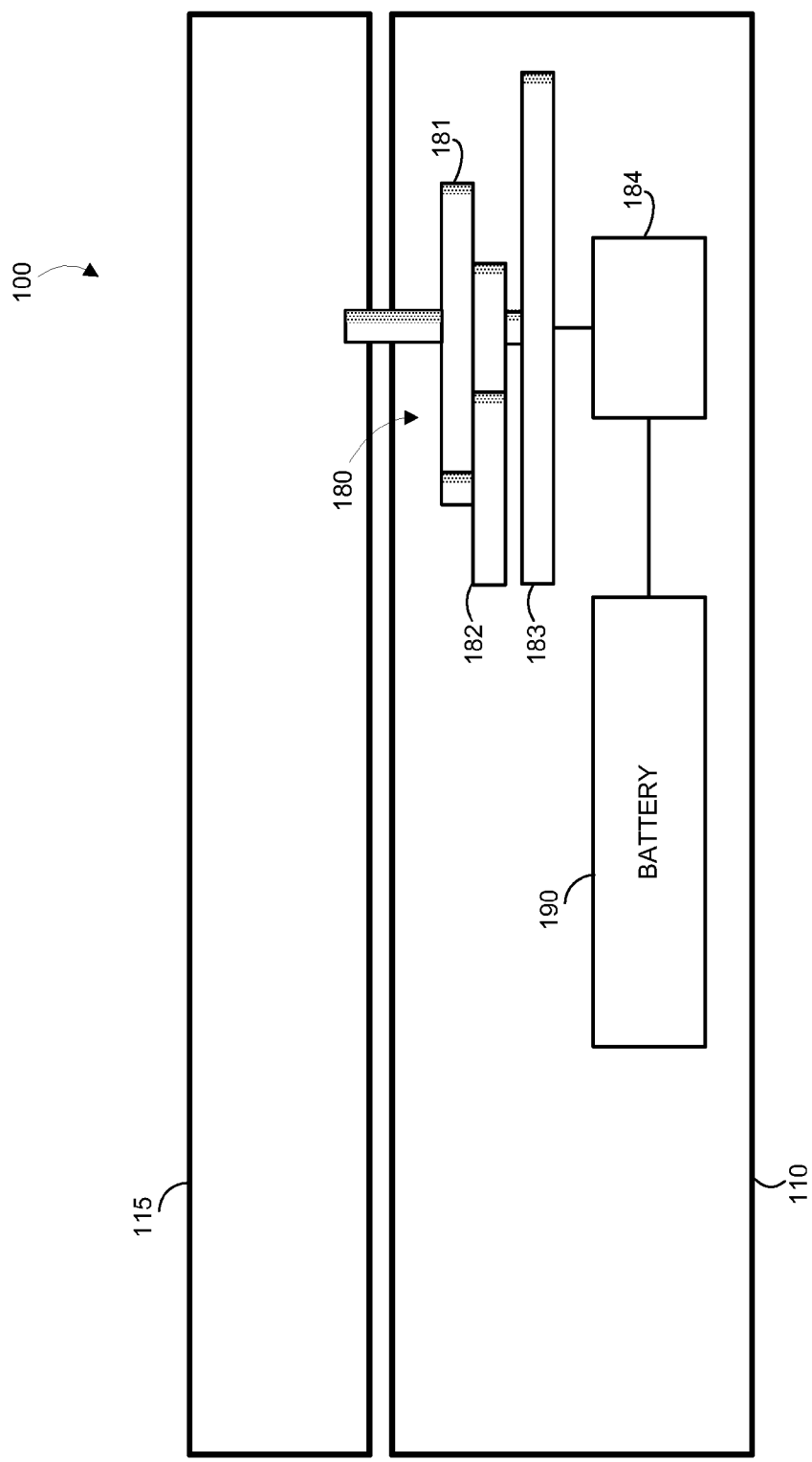
FIG. 4 is an exemplary open side view diagram of an apparatus according to a possible embodiment.

FIG. 4 is an exemplary open side view diagram of the apparatus 100 according to a possible embodiment. The apparatus can include a integral electric generator 180 including gears 181-183. For example, the integral electric generator 180 can include a crank and driver gear 181, a secondary gear 182, a flat motor 183, such as a pancake generator, and regulating and rectifying circuitry 184. The secondary gear 182 may be a clutch 182 coupled to the integral electric generator 180. The clutch 182 can be configured to disengage the integral electric generator 180 to disable charging of the battery 190 by the integral electric generator 180.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
a first portable electronic device housing;
first selective call receiver circuitry contained within the first portable electronic device housing;
a second portable electronic device housing rotatably coupled to the first portable electronic device housing, where the second portable electronic device housing is rotatable about an axis of the first portable electronic device housing;
second selective call receiver circuitry contained within the second portable electronic device housing, the second selective call receiver circuitry coupled to the first selective call receiver circuitry;

a battery; and
an integral electric generator coupled to the first portable electronic device housing, coupled to the second portable electronic device housing, and coupled to the battery, the integral electric generator configured to charge the battery based on rotation of the first portable electronic device housing relative to the second portable electronic device housing,
wherein the integral electric generator comprises a flat motor.

2. The apparatus according to claim 1, further comprising an optical data connection coupled between the first portable electronic device housing and the second portable electronic device housing,
wherein the second selective call receiver circuitry is coupled to the first selective call receiver circuitry via the optical data connection.

3. The apparatus according to claim 2, further comprising a hinge including the optical data connection,
wherein the second portable electronic device housing is rotatably coupled to the first portable electronic device housing via the hinge.

4. The apparatus according to claim 1, further comprising:
a hinge coupled to the first portable electronic device housing and coupled to the second portable electronic device housing,
wherein the integral electric generator is coupled to the first portable electronic device housing and coupled to the second portable electronic device housing via the hinge.

5. The apparatus according to claim 1, further comprising a clutch coupled to the integral electric generator, the clutch configured to disengage the integral electric generator to disable charging of the battery by the integral electric generator.

6. The apparatus according to claim 1,
wherein the first selective call receiver circuitry comprises a selective call receiver transceiver, and
wherein the selective call receiver transceiver is configured to maintain a call while the integral electric generator charges the battery.

7. The apparatus according to claim 1,
wherein the first selective call receiver circuitry comprises a short range wireless transceiver, and
wherein the short range wireless transceiver is configured to maintain a short range wireless connection while the integral electric generator charges the battery.

8. The apparatus according to claim 1,
wherein the first selective call receiver circuitry comprises a speakerphone speaker, and
wherein the speakerphone speaker is configured to provide an audio interface while the integral electric generator charges the battery.

9. The apparatus according to claim 1,
wherein the first portable electronic device housing includes a first substantially planar surface, and
wherein the second portable electronic device housing includes a second substantially planar surface configured to rotatably slide across the first substantially planar surface in a plane substantially parallel to the first substantially planar surface.

10. The apparatus according to claim 1, further comprising an extendable crank handle, the extendable crank handle configured to assist in rotating the second portable electronic device housing about an axis of the first portable electronic device housing.

11. The apparatus according to claim 1, further comprising a mechanical interface coupled between the first portable electronic device housing and the second portable electronic device housing and coupled to the integral electric generator,
wherein the second portable electronic device housing is detachably coupled to the first portable electronic device housing, and
wherein the mechanical interface is configured to drive the integral electric generator when the second portable electronic device housing is detached from the first portable electronic device housing.

12. The apparatus according to claim 1,
wherein the second portable electronic device housing is detachably coupled to the first portable electronic device housing,
wherein the first portable electronic device housing includes a first short range wireless transceiver,
wherein the second portable electronic device housing includes a second short range wireless transceiver wirelessly coupled to the first short range wireless transceiver when the second portable electronic device housing is detached from the first portable electronic device housing.

13. The apparatus according to claim 1, wherein the second portable electronic device housing is rotatable 360 degrees about an axis of the first portable electronic device housing.

14. A rotator mobile phone comprising:
a rotator mobile phone base housing;
a controller coupled to the rotator mobile phone base housing, the controller configured to control operations of the rotator mobile phone;
a selective call receiver transceiver coupled to the rotator mobile phone base housing;
a rotator mobile phone blade housing rotatably coupled to the rotator mobile phone base housing, where the rotator mobile phone blade housing is rotatable 360 degrees about an axis of the rotator mobile phone base housing;
a speaker coupled to the rotator mobile phone blade housing and coupled to the controller;
a battery coupled to the rotator mobile phone base housing and coupled to the controller; and
an integral electric generator coupled to the rotator mobile phone base housing, coupled to the rotator mobile phone blade housing, and coupled to the battery, the integral electric generator configured to charge the battery based on rotation of the rotator mobile phone blade housing relative to the rotator mobile phone base housing,
wherein the integral electric generator comprises a crank and driver gear,
wherein the internal electric generator comprises a secondary gear coupled to the crank and driver gear,
wherein the internal electric generator comprises a flat motor coupled to the secondary gear,
wherein the internal electric generator comprises regulating and rectifying circuitry coupled to the flat motor and coupled to the battery.

15. The rotator mobile phone according to claim 14, further comprising a speakerphone speaker coupled to the rotator mobile phone base housing, the speakerphone speaker configured to provide an audio interface while the electric generator charges the battery.

16. The rotator mobile phone according to claim 14, further comprising a mechanical interface coupled between the rotator mobile phone base housing and the rotator mobile phone blade housing and coupled to the integral electric generator,
wherein the rotator mobile phone blade housing is detachably coupled to the rotator mobile phone base housing, and wherein the mechanical interface is configured to drive the integral electric generator when the rotator mobile phone blade housing is detached from the rotator mobile phone base housing.

17. The rotator mobile phone according to claim 14, wherein the rotator mobile phone blade housing is detachably coupled to the rotator mobile phone base housing,
wherein the rotator mobile phone base housing includes a first short range wireless transceiver, and
wherein the rotator mobile phone blade housing includes a second short range wireless transceiver wirelessly coupled to the first short range wireless transceiver when the rotator mobile phone blade housing is detached from the rotator mobile phone base housing.

18. The rotator mobile phone according to claim 17, wherein the second short range transceiver in the rotator mobile phone blade housing comprises a Bluetooth walkie-talkie transceiver configured to communicate with another Bluetooth walkie-talkie transceiver.

19. A rotator mobile phone comprising:
a rotator mobile phone base housing;
a controller coupled to the rotator mobile phone base housing, the controller configured to control operations of the rotator mobile phone;
a selective call receiver transceiver coupled to the rotator mobile phone base housing and coupled to the controller;
a display coupled to the rotator mobile phone base housing and coupled to the controller;
a speakerphone speaker coupled to the rotator mobile phone base housing and coupled to the controller;
a battery coupled to the rotator mobile phone base housing and coupled to the controller;
a rotator mobile phone blade housing rotatably coupled to the rotator mobile phone base housing, where the rotator mobile phone blade housing is rotatable 360 degrees about an axis of the rotator mobile phone base housing;
a speaker coupled to the rotator mobile phone blade housing and coupled to the controller; and
an integral electric generator coupled to the rotator mobile phone base housing, coupled to the rotator mobile phone blade housing, and coupled to the battery, the integral electric generator configured to charge the battery based on rotation of the rotator mobile phone blade housing relative to the rotator mobile phone base housing,
wherein the integral electric generator comprises a crank and driver gear,
wherein the internal electric generator comprises a secondary gear coupled to the crank and driver gear,
wherein the internal electric generator comprises a flat motor coupled to the secondary gear,
wherein the internal electric generator comprises regulating and rectifying circuitry coupled to the flat motor and coupled to the battery.

\* \* \* \* \*